United States Patent [19]
Ibaraki et al.

[11] Patent Number: 5,627,705
[45] Date of Patent: May 6, 1997

[54] RECORDING AND/OR REPRODUCING APPARATUS HAVING ROTARY DRUM UNIT

[75] Inventors: Shoichi Ibaraki, Tokyo; Masahide Hasegawa, Kanagawa-ken, both of Japan

[73] Assignee: Canon Kabushiki Kaisha, Tokyo, Japan

[21] Appl. No.: 622,938

[22] Filed: Mar. 27, 1996

Related U.S. Application Data

[63] Continuation of Ser. No. 301,488, Sep. 7, 1994, abandoned.

[30] Foreign Application Priority Data

Sep. 14, 1993 [JP] Japan ................... 5-252257

[51] Int. Cl.$^6$ .................................. G11B 15/61
[52] U.S. Cl. ........................ 360/130.24; 360/84
[58] Field of Search ...................... 360/84, 85, 107, 360/108, 130.22, 130.23, 130.24

[56] References Cited

U.S. PATENT DOCUMENTS 4,257,076  3/1981  Shimizu et al. ................ 360/130.24

FOREIGN PATENT DOCUMENTS

| | | | |
|---|---|---|---|
| 59-154664 | 9/1984 | Japan | 360/130.24 |
| 61-175955 | 8/1986 | Japan | 360/130.24 |
| 63-14358 | 1/1988 | Japan | 360/130.24 |
| 1-315058 | 12/1989 | Japan | 360/130.24 |
| 2-278555 | 11/1990 | Japan . | |
| 3-224156 | 10/1991 | Japan | 360/130.24 |
| 4-42420 | 2/1992 | Japan . | |

*Primary Examiner*—Robert S. Tupper
*Assistant Examiner*—David L. Ometz
*Attorney, Agent, or Firm*—Robin, Blecker, Daley & Driscoll

[57] ABSTRACT

A recording and/or reproducing apparatus for recording and/or reproducing information on or from a tape-shaped recording medium includes a head arranged to record and/or reproduce information on or from the recording medium, and a rotary drum which has the head mounted thereon and is arranged to have the tape-shaped recording medium wrapped around the outer peripheral surface thereof. A plurality of grooves are formed in the outer peripheral surface in such a way as to surround the outer peripheral surface. The outer peripheral surface includes a first outer peripheral surface and a second outer peripheral surface which has a smaller diameter than the first outer peripheral surface. Each of the plurality of grooves are sandwiched in between the first and second outer peripheral surfaces.

12 Claims, 9 Drawing Sheets

RECORDING AND/OR REPRODUCING APPARATUS HAVING ROTARY DRUM UNIT

This is a continuation of prior application Ser. No. 08/301,488, filed Sep. 7, 1994, now abandoned.

BACKGROUND OF THE INVENTION

1. Field of the Invention

This invention relates to a rotary drum unit in a recording and/or reproducing apparatus such as a video tape recorder (hereinafter referred to as VTR).

2. Description of the Related Art

The structural arrangement of rotary drum units heretofore adapted for recording and/or reproducing apparatuses such as VTRs is, for example, as shown in FIG. 1. Referring to FIG. 1, a rotary drum unit 10 includes a rotary upper drum 11, a magnetic head 12 which is secured to the upper drum 11, and a stationary lower drum 13. A support shaft 14 is secured to the lower drum 13. A transformer base 15 for a rotary transformer 17 is rotatably supported by the support shaft 14 through a bearing 16. The rotary transformer 17 (rotor) is secured to the transformer base 15. A rotary transformer 18 (stator) is secured to the lower drum 13 in a state of being opposed to the other rotary transformer 17. A motor coil 19 is secured to the support shaft 14. A motor magnet 20 is secured to the upper drum 11.

FIG. 2 shows the rotary drum unit 10 in a state of operation, that is, recording or reproducing on or from a magnetic tape 21. The magnetic tape 21 is guided by a plurality of guide posts 22 to be smoothly and precisely wrapped around the upper drum 11 of the rotary drum unit 10.

With the rotary drum unit 10 arranged in this manner, when a predetermined current is allowed to flow to the motor coil 19, a rotating force is generated at the motor magnet 20. As a result, the upper drum 11, the magnetic head 12, the transformer base 15 and the rotary transformer 17 rotate. After that, the magnetic tape 21 comes to be obliquely wrapped around the rotary drum unit 10 as shown in FIG. 2 to make the VTR ready for recording or reproduction on or from the magnetic tape 21.

A plurality of grooves 23 which are for example in a triangular sectional shape are carved in the outer peripheral surface 11a of the upper drum 11 of the rotary drum 10, as shown in FIG. 3. These grooves 23 not only prevent the magnetic tape 21 from sticking to the outer peripheral surface 11a of the upper drum 11 when the rotary drum unit 10 is stopped, but also serve to minimize the thickness of a so-called air film which is generated over the outer peripheral surface 11a, so that the magnetic tape 21 can be allowed to travel in a stable manner.

The magnetic tape 21 comes into contact with the rotary drum unit 10 in the neighborhood of a point A shown in FIG. 2 on the tape entrance side. Then, if an excessively thick air film is generated, the contacting state of the magnetic tape 21 becomes unstable. The possibility of such unstable contact can be eliminated by forming the grooves 23 deep as shown in FIG. 4.

In the case of the conventional rotary drum unit 10, however, a difference between the thickness of an air film generated on the tape entrance side (the point A in FIG. 2) and the thickness of an air film generated on the tape exit side of the rotary drum 10 (a point B in FIG. 2) increases accordingly as the rotational frequency of the rotary drum 10 increases. The increase of the difference in air film thickness then brings about a difference in pressing contact force between the magnetic head 12 and the magnetic tape 21. The difference of the pressing contact force fluctuates the level of the reproduction output of the VTR. This tendency of fluctuations becomes more salient as the relative speed of the magnetic tape 21 and the rotary upper drum 11 is higher and also as the frequency of signals reproduced becomes higher.

Further, with the grooves 23 formed deep as mentioned above (FIG. 4), the thickness of an air film can be reduced to a certain extent on the tape entrance side. However, the deep grooves 23 cause the magnetic tape 21 to wave correspondingly with the grooves 23. The waving then causes the magnetic tape 21 not only to travel unstably but also to be damaged where the magnetic tape 21 comes into contact with the edge parts of the grooves 23 on the tape exit side if the grooves 23 are formed too deep.

This problem may be solved by increasing the number of the grooves 23. However, the maximum number of the grooves 23 to be formed is limited in relation to the depth of the grooves 23. It is, therefore, difficult in fact to simply increase the number of the grooves 23. Besides, the results of experiments have indicated that the advantageous effect attainable by increasing the number of the grooves 23 is limited. Further, some effect may be attained also by adequately setting some conditions including the rigidity of the magnetic tape 21, the traveling speed of the magnetic tape 21 relative to the rotary upper drum 11, etc. However, a desired effect of such solution is hardly expectable in cases where a relative speed between the upper drum 11 and the magnetic tape 21 is high and where the air film is thick.

SUMMARY OF THE INVENTION

In view of the situation of the prior art described above, it is an object of this invention to provide a recording and/or reproducing apparatus having a rotary drum unit which is capable of causing a tape-shaped recording medium to always stably travel so as to stabilize the level of a reproduction output.

To attain this object, a recording and/or reproducing apparatus for recording and/or reproducing information on or from a tape-shaped recording medium which is arranged as an embodiment of this invention, includes a head arranged to record and/or reproduce information on or from the tape-shaped recording medium, and a rotary drum having the head mounted thereon and having an outer peripheral surface around which the recording medium is wrapped, the outer peripheral surface having a plurality of grooves formed surrounding the outer peripheral surface, the outer peripheral surface including a first outer peripheral surface and a second outer peripheral surface which has a smaller diameter than that of the first outer peripheral surface, and each of the plurality of grooves being sandwiched in between the first outer peripheral surface and the second outer peripheral surface.

Further, to attain the above-stated object from a different point of view, a rotary drum unit which is arranged as the embodiment of this invention includes a rotary drum having a head mounted thereon and having an outer peripheral surface around which a recording medium is wrapped, the outer peripheral surface having a plurality of grooves formed surrounding the outer peripheral surface, the outer peripheral surface including a first outer peripheral surface and a second outer peripheral surface which has a smaller diameter than that of the first outer peripheral surface, and each of the plurality of grooves being sandwiched in between the first outer peripheral surface and the second outer peripheral surface, and a stationary drum arranged to rotatably support the rotary drum.

The above and other objects and features of this invention will become apparent from the following detailed description of embodiments thereof taken in connection with the accompanying drawings.

DETAILED DESCRIPTION OF THE PREFERRED EMBODIMENTS

Figure 1:
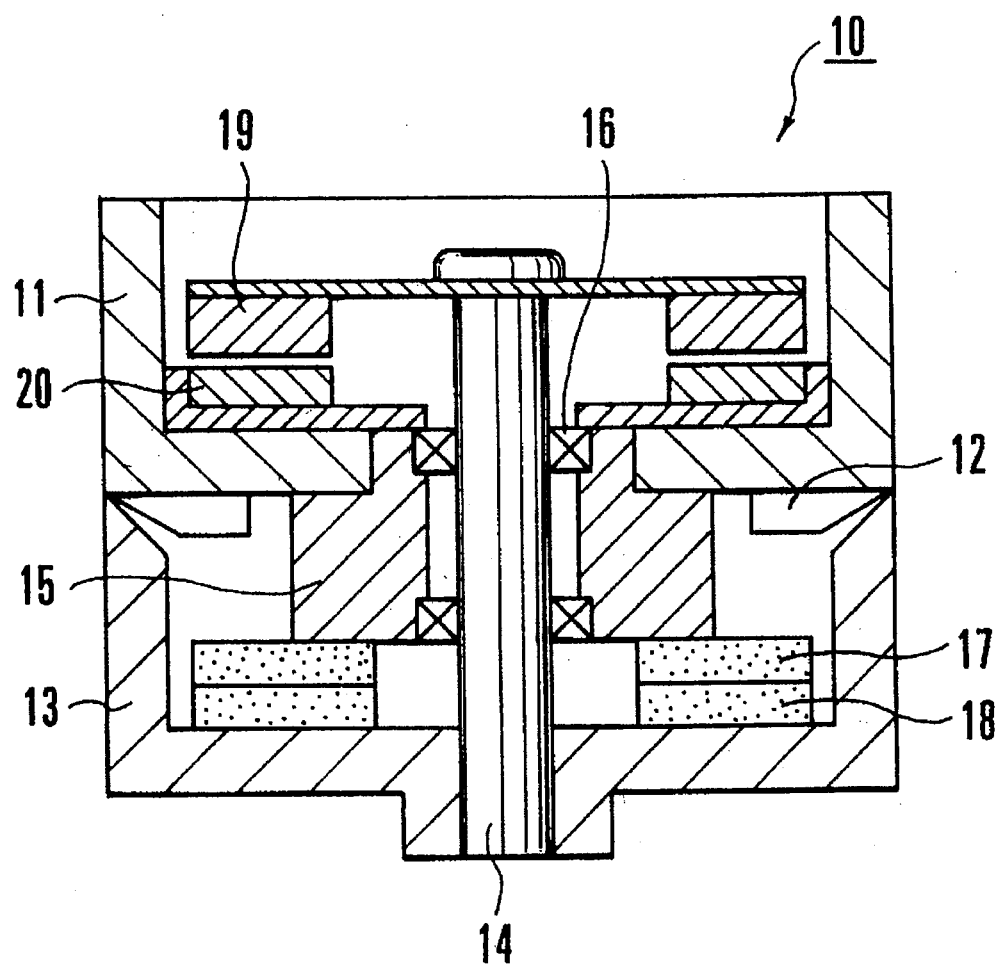
FIG. 1 is a vertical sectional view showing the conventional rotary drum unit.
Figure 2:
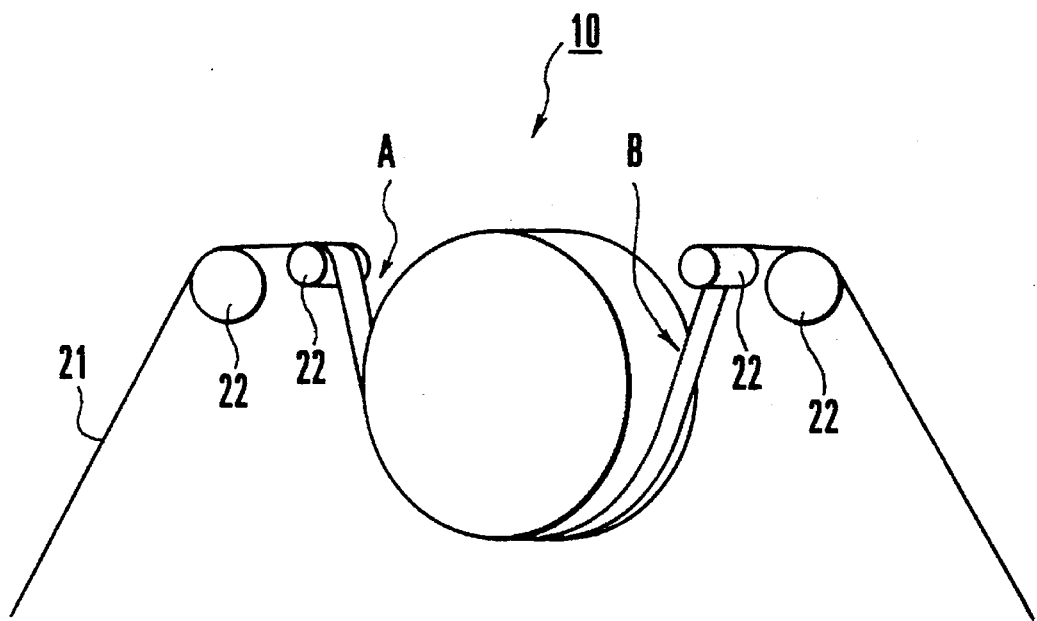
FIG. 2 is an oblique view showing the conventional rotary drum unit as having a tape in a state of traveling.
Figure 3:
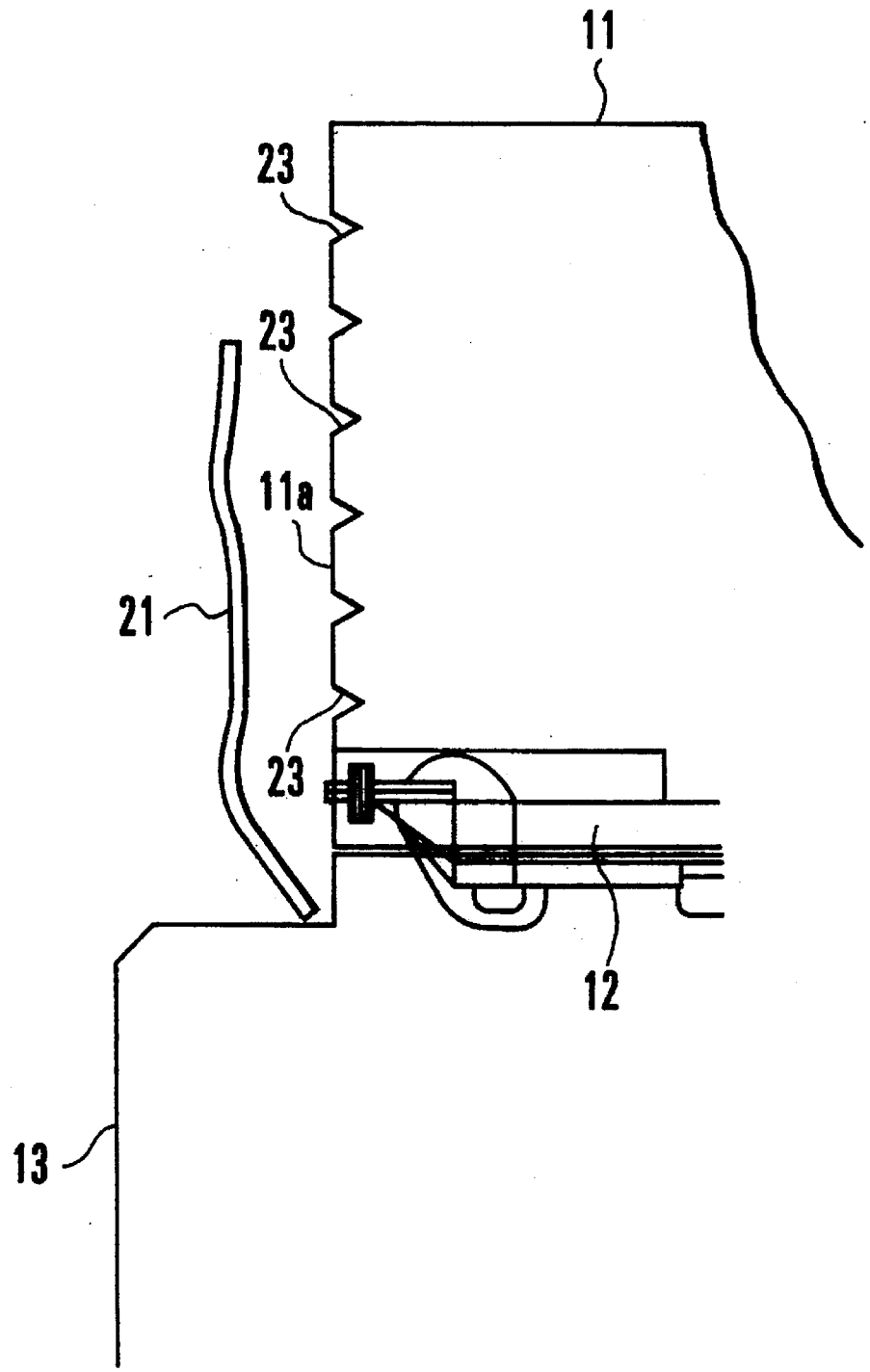
FIG. 3 is a vertical sectional view showing the essential parts of the conventional rotary drum unit.
Figure 4:
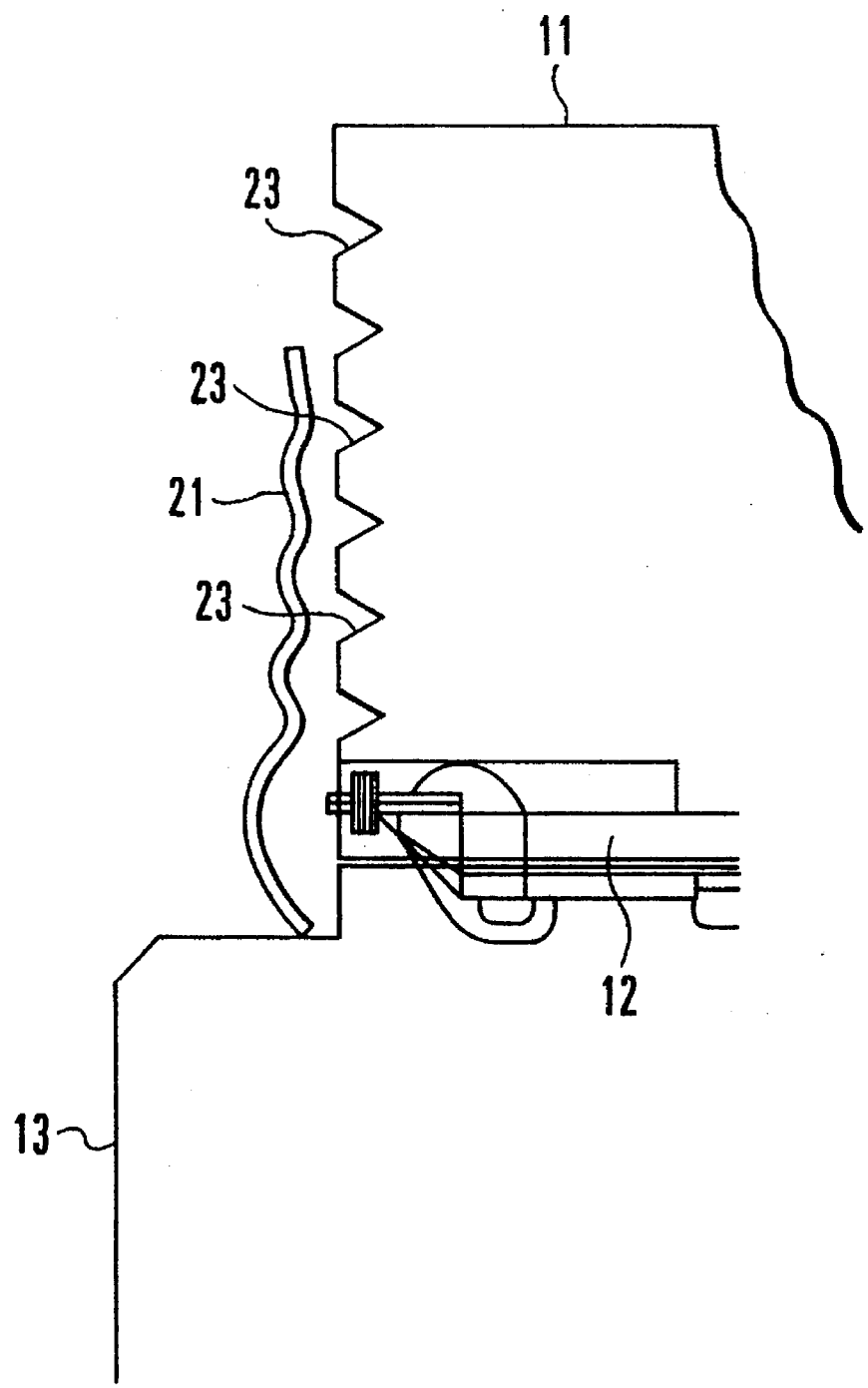
FIG. 4 is a vertical sectional view showing the essential parts of another conventional rotary drum unit.
Figure 5:
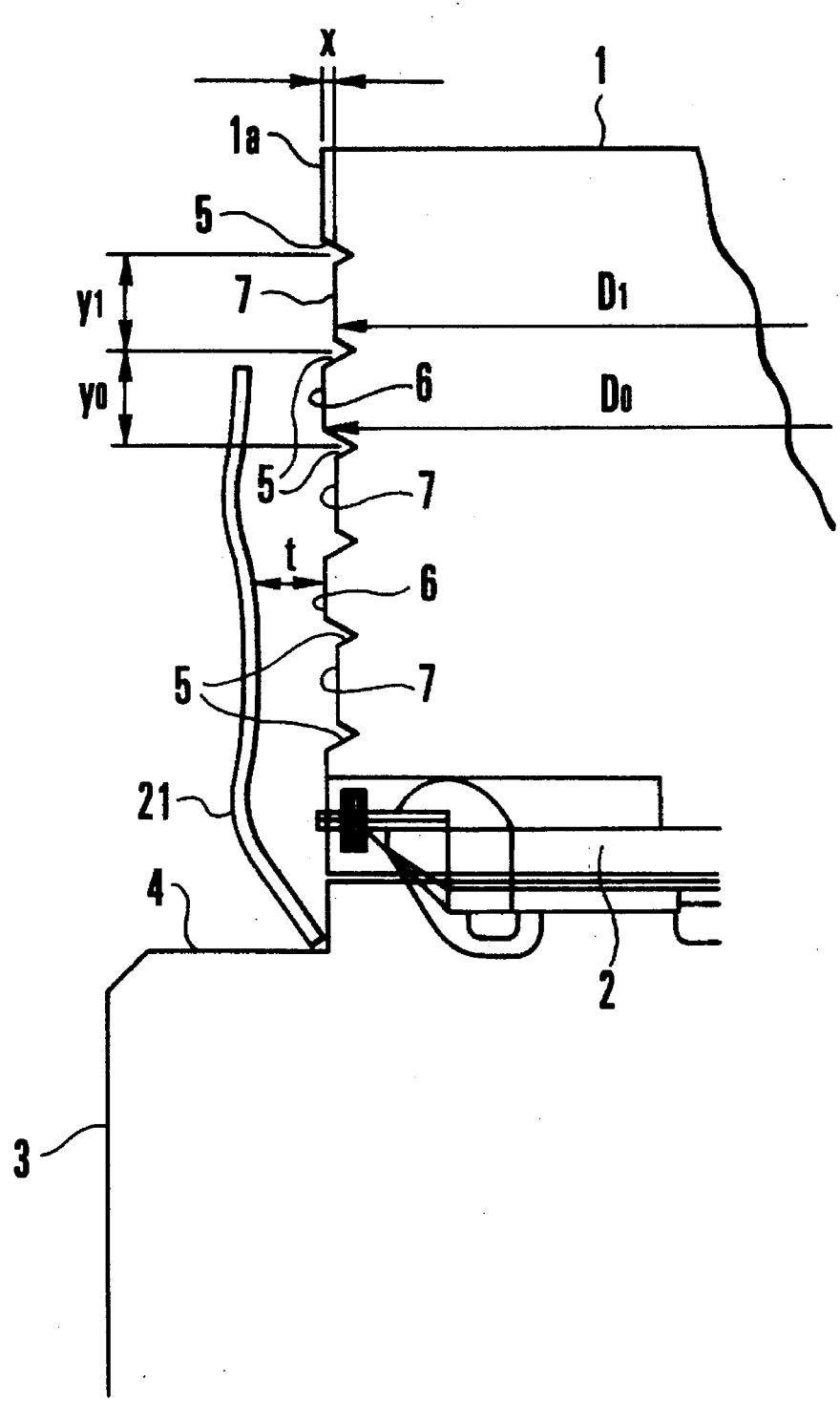
FIG. 5 is a vertical sectional view showing the essential parts of a rotary drum unit which is arranged according to this invention as an embodiment thereof.
Figure 6:
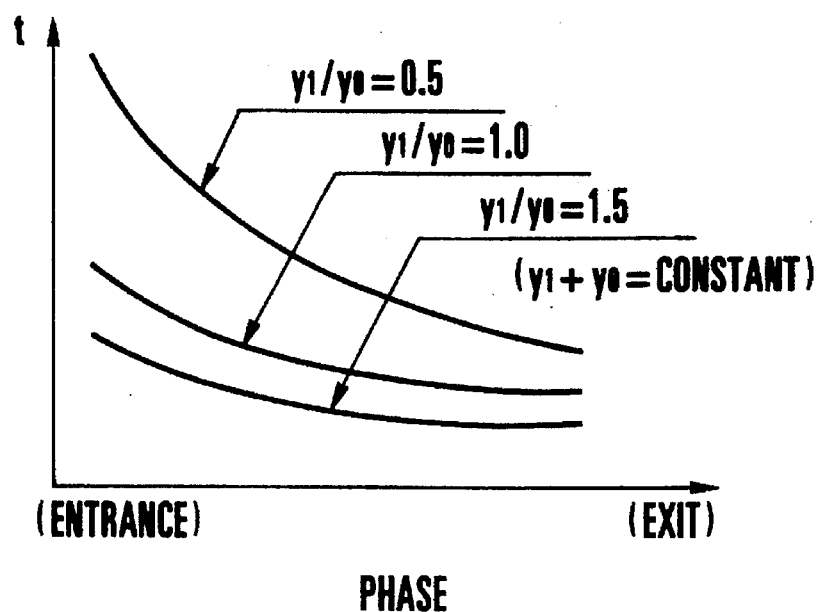
FIG. 6 is a graph showing the ratio of widths of the first and second outer peripheral surfaces of the rotary drum unit of this invention in relation to the thickness of an air film.
Figure 7:
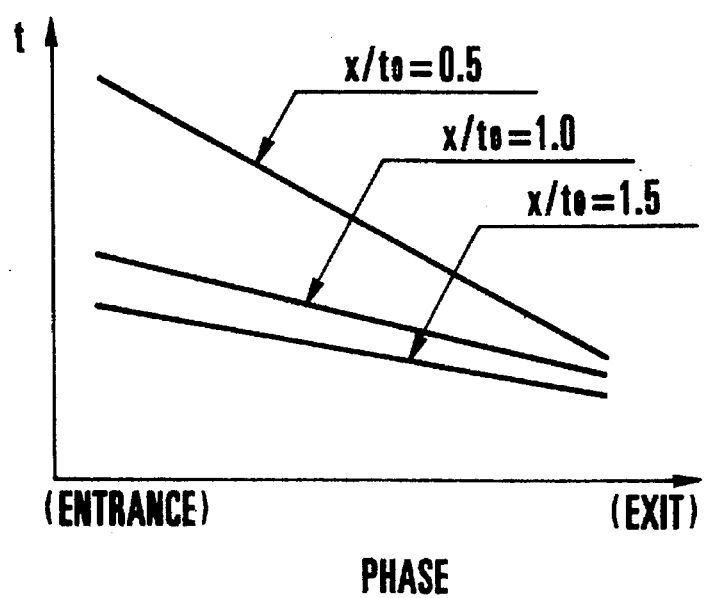
FIG. 7 is a graph showing the depth of the second outer peripheral surface of the rotary drum unit of this invention in relation to the thickness of an air film.
Figure 8:
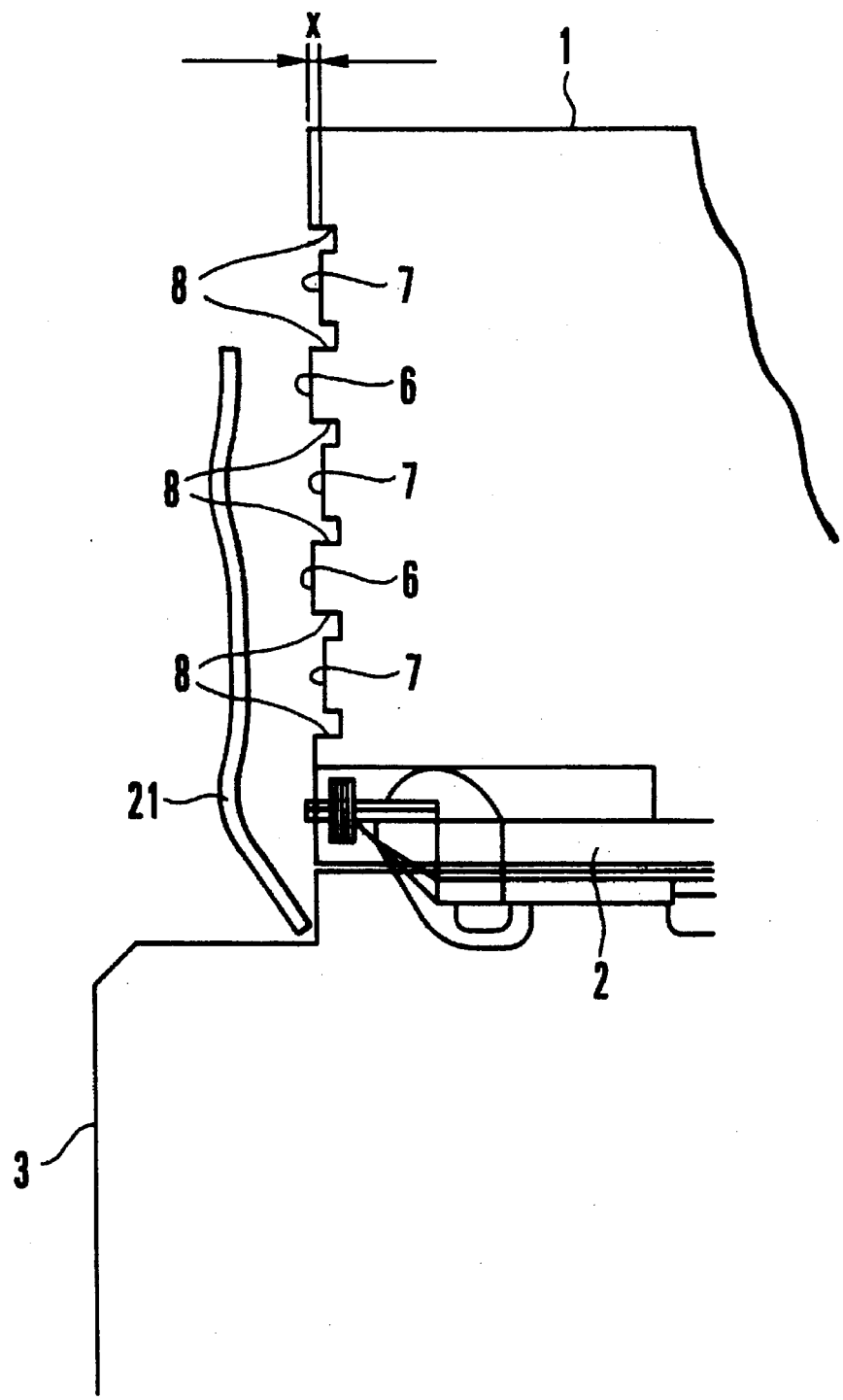
FIG. 8 is a vertical sectional view showing by way of example the essential parts of a modification of the rotary drum unit of this invention.

The following describes a rotary drum unit which is an embodiment of this invention on the basis of FIGS. 5, 6 and 7, referring also to FIGS. 1 to 4 as necessary.

FIG. 5 shows by way of example the arrangement of the essential parts of the rotary drum unit. The rotary drum unit includes a rotary upper drum 1, a magnetic head 2 which is secured to the rotary upper drum 1, and a stationary lower drum 3. Other members of the rotary drum unit are arranged basically in the same manner as those of the conventional rotary drum unit described in the foregoing and, therefore, the details of them are omitted from the following description. In FIG. 5, the rotary drum unit is shown in a state which is the same as the state shown in FIG. 2, i.e., in a state of being ready for recording or reproducing on or from a magnetic tape 21. FIG. 5 shows this state in a vertical sectional view taken across a part near to the point A shown in FIG. 2.

A plurality of sticking preventing grooves 5 having a triangular sectional shape are carved around the outer peripheral surface 1a of the upper drum 1, as shown in FIG. 5. The magnetic tape 21 can be brought into contact with the outer peripheral surface 1a. The outer peripheral surface 1a includes a first outer peripheral surface 6 having a larger diameter (diameter $D_0$) and a second outer peripheral surface 7 having a smaller diameter ($D_1$) which is smaller than the diameter of the first outer peripheral surface 7 by a predetermined amount. The first outer peripheral surface 6 and the second outer peripheral surface 7 are arranged as parts between which each of the grooves 5 is formed. The width y0 of the first outer peripheral surface 6 and the width y1 of the second outer peripheral surface 7 (in the vertical direction as viewed in FIG. 5) are set at predetermined values. In the case of this example, the first and second outer peripheral surfaces 6 and 7 are alternately arranged in the direction of their widths. Further, the depth x of the second outer peripheral surface 7 is determined by a difference between the diameters $D_0$ and $D_1$ of the first and second outer peripheral surfaces 6 and 7. With the outer peripheral surfaces 6 and 7 arranged to be in such a phase relation, the upper edge part of the magnetic tape 21 does not reach the uppermost groove 5.

The values of thickness t of an air film which are obtained both on the tape entrance side and the tape exit side are measured by varying the value "y1/y0" of the widths y0 and y1 of the first and second outer peripheral surfaces 6 and 7 without varying the sum of them "y1+y0" and also without varying the value of the depth x. FIG. 6 shows the results of measurement. As apparent from FIG. 6, the thickness t of the air film becomes thinner and a change of the thickness t of the air film extending from the tape entrance side through the tape exit side becomes smaller, accordingly as the value "y1/y0" increases. However, if the value "y1/y0" is extremely large, the magnetic tape 21 might be deformed, depending on the value of the depth x of the second outer peripheral surface 7.

In a case where the value "y1+y0" is varied with the value "y1/y0" set to be constant, i.e., where the pitch of arrangement of the grooves 5 is varied, not only the effect mentioned in the foregoing description of the prior art is hardly attainable but also machining work on the grooves 5 comes to require an extremely long time if the value "y1+y0" is too small in relation to the width of the magnetic tape 21 (if the pitch is too fine). Further, if the value "y1+y0" is too large, the magnetic tape 21 might be deformed, depending on the value of the depth x of the second outer peripheral surface 7.

Next, with respect to the value of the depth x of the second outer peripheral surface 7, the values of the thickness t of the air film obtained at the tape entrance side and at the tape exit side are measured by varying the value "x/t0", where the thickness of the air film obtained at the beginning of wrapping the magnetic tape 21 around the rotary drum unit 10 without providing any difference in diameter of the outer peripheral surface is assumed to be t0 (constant). FIG. 7 shows the results of that measurement. As apparent from FIG. 7, the thickness t of the air film becomes smaller from the tape entrance side to the tape exit side and varies more moderately accordingly as the value "x/t0" is larger, i.e., the depth x of the second outer peripheral surface 7 is deeper. However, the tape 21 might be deformed if the value "x/t0" is too large.

It is a main object of this invention to prevent as much as possible the thickness t of the air film obtained on the tape entrance side from becoming different from the thickness t of the air film obtained on the tape exit side and also to reduce the thickness t of the air film over the whole circumferential area of the upper drum 11 in such a way as to eliminate the possibility of having the magnetic tape 21 damaged by the contact with the upper drum 11. According to the results of measurements shown in FIGS. 6 and 7, the main object of this invention can be most effectively attained by setting the above-stated factors at numerical values, respectively as follows: y1/y0=1, y1+y0=3.4 mm, and x/t0= 1.

The widths y0 and y1 of the first and second outer peripheral surfaces 6 and 7, the depth x of the second outer peripheral surface 7, etc., can be varied according to the rigidity of the magnetic tape 21, the speed of the magnetic tape 21 relative to the rotary upper drum 11, the tension or width of the magnetic tape 21, etc. Their optimum numerical values can be accurately set through experiments, etc., to decrease the thickness t of the air film without damaging the magnetic tape 21.

Further, the rotary drum unit 10 must be arranged to have the upper edge part of the magnetic tape 21 not come in touch with the smaller diameter part of the upper drum 1. If the upper edge part of the magnetic tape 21 comes into contact with the smaller diameter part of the upper drum 1, linearity tends to be deteriorated with a pressing force of the magnetic tape 21 on a lead 4 decreased. Therefore, this must be prevented.

In the embodiment described above, a plurality of grooves 8 having a square sectional shape, instead of a triangular sectional shape, may be carved in the outer peripheral surface of the upper drum 1. Then, the same effect as the embodiment described above is attainable by this modification.

Figure 9:
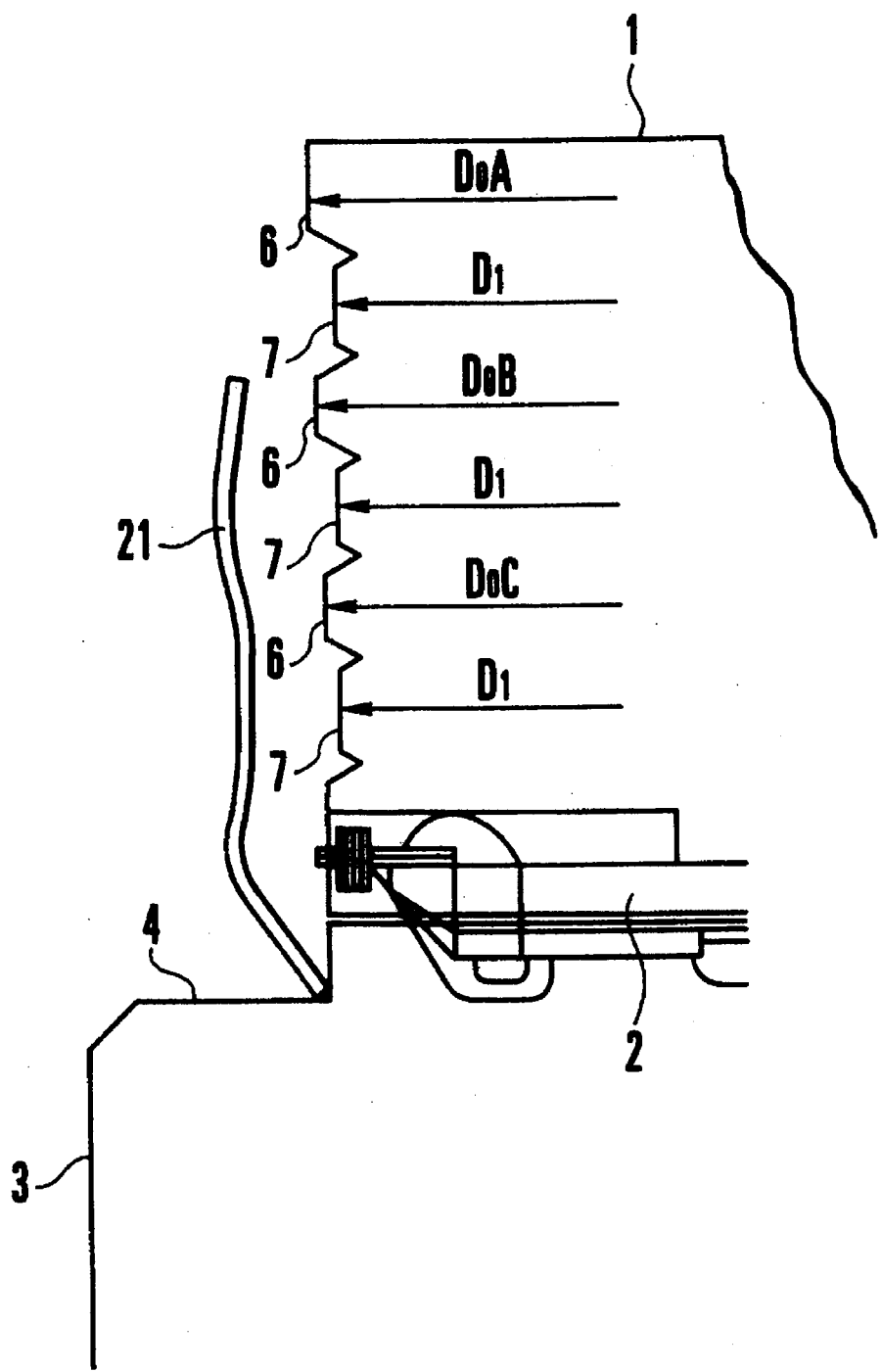
FIGS. 9 and 10 are vertical sectional views showing the essential parts of rotary drum units according to this invention as other embodiments thereof.

Further, in either case, if the first outer peripheral surface (tape contacting part) 6 of the upper drum 1 is formed into a tapered shape as shown in FIG. 9 so as to stablize the travel of the tape, the diameters $D_0A$, $D_0B$ and $D_0C$ are made to become smaller according to the tapered shape as they approach the head 2 ($D_0A>D_0B>D_0C>D_1$). Usually, an air film is generated thicker at the upper end portion of the upper drum 1 which is distant from the head 2. However, since, in the embodiment of FIG. 9, a step difference between the outer diameters of a portion more distant from the head 2 can be made larger by keeping the diameter $D_1$ of the second outer peripheral surface 7 constant, the uniformity of the thickness of the air film is more enhanced than in the above-described embodiment.

Figure 10:
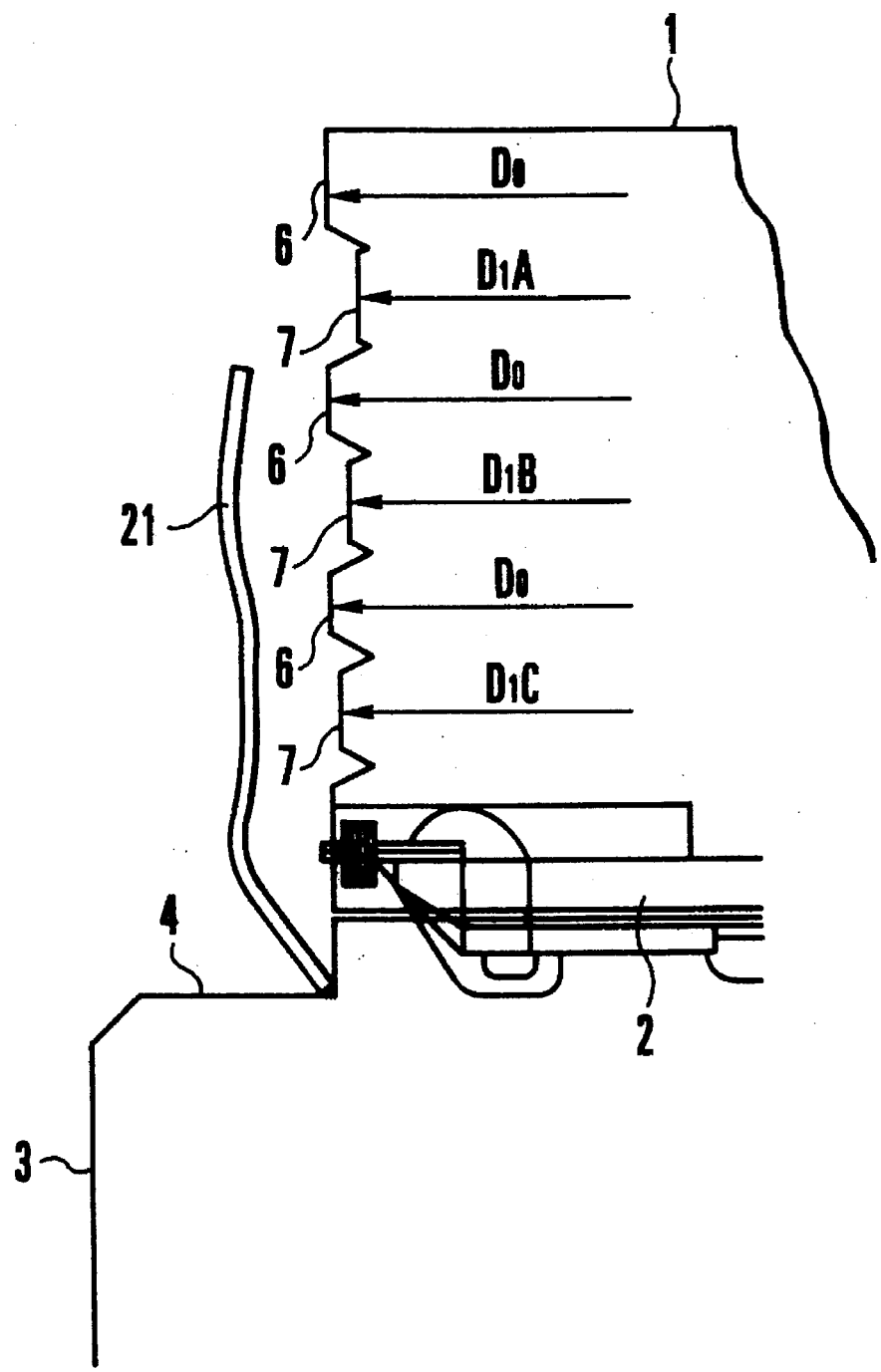

Furthermore, if the diameter $D_0$ of the first peripheral surface 6 is made constant, the same advantageous effect as that of the embodiment of FIG. 9 can be obtained by making the diameters $D_1A$, $D_1B$ and $D_1C$ of the second outer peripheral surface 7 larger as they approach the head 2, as shown in FIG. 10 ($D_1A<D_1B<D_1C<D_0$). In the case of this embodiment, the individual diameter portions of the second peripheral surface 7 are formed as outer peripheral surfaces of cylindrical shape, so that a working process can be made easy.

As described above, this embodiment is arranged to reduce the diameters of predetermined parts of the outer peripheral surface of the rotary drum located between the grooves provided for preventing the magnetic tape from sticking to the rotary drum, in such a way as to lessen a difference between the air film thickness obtained on the tape entrance side and the air film thickness obtained on the tape exit side, so that the level of the reproduction output of the recording and/or reproducing apparatus can be made uniform. Further, with the air film arranged to have uniform thickness, the pressing force of the tape on the lead becomes constant for improvement in linearity. Further, the grooves can be formed substantially by the same machining process as the conventional rotary drum unit without increasing the cost of manufacture.

What is claimed is:

1. A recording and/or reproducing apparatus for recording and/or reproducing information on or from a tape-shaped recording medium, comprising:

a) a head arranged to record and/or reproduce information on or from the tape-shaped recording medium; and b) a rotary drum having said head mounted thereon and having an outer peripheral surface around which the recording medium is wrapped, said outer peripheral surface having a plurality of grooves formed surrounding said outer peripheral surface, said outer peripheral surface including at least two first outer peripheral surfaces and at least one second outer peripheral surface which has a smaller diameter than that of said first outer peripheral surfaces, each of said at least one second outer peripheral surface being sandwiched respectively in between said first outer peripheral surfaces, each of said plurality of grooves being sandwiched in between one of said first outer peripheral surfaces and said second outer peripheral surface, and the length of said first outer peripheral surfaces and the length of said second outer peripheral surface in the direction of an axis of rotation of said rotary drum are equal to each other, whereby a first air film thickness between said recording medium and said rotary drum on a recording medium entrance side of said rotary drum is substantially the same thickness as a second air film thickness on a recording medium exit side of said rotary drum.

2. An apparatus according to claim 1, wherein said first and second outer peripheral surfaces are alternately arranged in the direction of said axis of rotation of said rotary drum.

3. An apparatus according to claim 1, wherein said plurality of grooves each have a triangular sectional shape.

4. An apparatus according to claim 1, wherein said plurality of grooves each have a trapezoidal sectional shape.

5. A rotary drum unit comprising:

a) a rotary drum having a head mounted thereon and having an outer peripheral surface around which a recording medium is wrapped, said outer peripheral surface having a plurality of grooves formed surrounding said outer peripheral surface, said outer peripheral surface including at least two first outer peripheral surfaces and at least one second outer peripheral surface which has a smaller diameter than that of said first outer peripheral surfaces, each of said at least one second outer peripheral surface being sandwiched, respectively, in between said first outer peripheral surfaces, each of said plurality of grooves being sandwiched in between one of said first outer peripheral surfaces and said second outer peripheral surface, and the length of said first outer peripheral surfaces and the length of said second outer peripheral surface in the direction of an axis of rotation of said rotary drum are equal to each other, whereby a first air film thickness between said recording medium and said rotary drum on a recording medium entrance side of said rotary drum is substantially the same thickness as a second air film thickness on a recording medium exit side of said rotary drum; and b) a stationary drum arranged to rotatably support said rotary drum.

6. A rotary drum unit according to claim 5, wherein said first and second outer peripheral surfaces are alternately arranged in the direction of said axis of rotation of said rotary drum.

7. A rotary drum unit according to claim 6, wherein said first outer peripheral surfaces and said second outer peripheral surface each include a plurality of outer peripheral surfaces, and wherein said first outer peripheral surfaces are in a tapered shape.

8. A rotary drum unit according to claim 7, wherein said plurality of second outer peripheral surfaces have the same diameter.

9. A rotary drum unit according to claim 6, wherein said first outer peripheral surfaces and said second outer peripheral surface each include a plurality of outer peripheral surfaces, and wherein said plurality of first outer peripheral surfaces have the same diameter.

10. A rotary drum unit according to claim 9, wherein said plurality of second outer peripheral surfaces have respective diameters made larger as said plurality of second outer peripheral surfaces approach said stationary drum.

11. A rotary drum unit according to claim 5, wherein said plurality of grooves each have a triangular sectional shape.

12. A rotary drum unit according to claim 5, wherein said plurality of grooves each have a trapezoidal sectional shape.

\* \* \* \* \*